J. D. FIELD.
Harvester and Thrasher.
No. 101,849. Patented April 12, 1870.
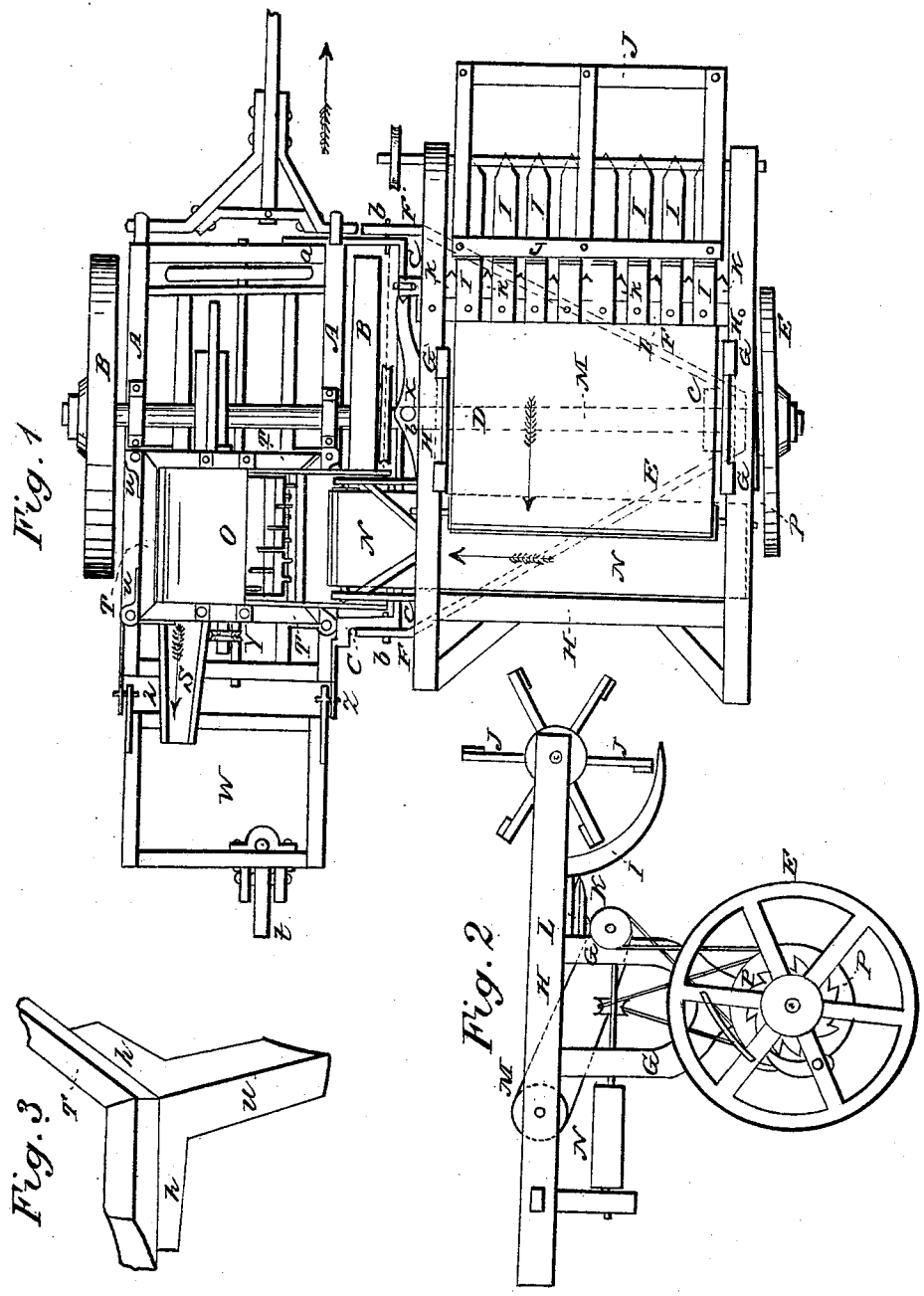

United States Patent Office.

J. D. FIELD, OF KEOKUK, IOWA.

Letters Patent No. 101,849, dated April 12, 1870.

IMPROVEMENT IN COMBINED HARVESTER AND THRASHER.

The Schedule referred to in these Letters Patent and making part of the same.

*To all whom it may concern:*

Be it known that I, J. D. FIELD, of Keokuk, in the county of Lee and State of Iowa, have invented a new and useful Improvement in Harvesters; and I do hereby declare the following to be a full, clear, and exact description thereof, which will enable others skilled in the art to make and use the same, reference being had to the accompanying drawings forming part of this specification, in which—

Figure 1 is a plan of my improved harvester as if seen from above.

Figure 2 is an elevation of the grain-wheel side of the same.

Figure 3 is a perspective view of brace-tops of the legs of the thrasher-frame on the same.

Similar letters of reference indicate like parts.

The object of this invention is to secure the wheat crop and similar grain by a cheap and single direct process, by which one man and team, with this harvester, can gather his crop as readily at one operation, as ten or fifteen men and several teams do usually through two or three distinct operations at different times, at a saving in cost of from thirty to forty cents per bushel, besides loss and damage.

To do this, my improved harvester is made with the several parts formed and arranged as shown in the drawings, and as hereinafter set forth, for gathering the grain in the head from the standing straw, and thrashing into loose grain and chaff at one operation, the grain being first allowed to get thoroughly ripe standing.

A represents the draft-frame mounted upon the driving-wheels B B.

C is a bar extending from the front end of frame A to the side near its rear end, bolted and firmly fixed to the frame A at $a\ a$, and having a bearing near its center on end of shaft supporting the inner drive-wheel B.

From this bar C extends a stationary shaft, D, to bear the grain-wheel E, and is suitably braced by the parts F F' shown by dotted lines, being hinged at their ends to the bar C at $b\ b'$, so that the whole side attachment can swing up and down independent of frame A.

From this shaft D, near its ends, rise arms G G, which divide each into two parts, to support a frame, H, which supports the cutting and gathering apparatus.

The stationary shaft D, by passing through braces F F' near grain-wheel E, and having a projection or enlargement between wheel E and braces F F", and by passing through lower ends of arms G G, is held fixed and firm into a frame by the nut $c$, which can be loosened at pleasure.

Frame H is made with two long parts running parallel with each other, framed together near the rear end by a cross-piece, and suitably braced.

These form the header-frame for supporting the teeth I I, which latter are curved down and forward to reach the short and down grain, and to fit in the course of the reel J, so that it will drive the heads up over the sickles K K.

These fingers I I are set at such a distance apart as to permit the passage of the straw, but not the heads, between them, and are made in a triangular shape cross-section, or of thin, flat material, curved as above set forth, with a rib on their under side for a stiffening and support, similar to a T-shaped section, all substantially fastened to the finger-bar L, the latter suitably constructed for that purpose, reaching across the forward part of frame H, and securely fastened thereto.

Directly under the fingers I I, and close to the front edge of finger-bar L, are the sickles for cutting off the heads, composed of a stationary sickle secured to the finger-bar L by bolts. This sickle is made of one piece with saw-shape teeth, or in a number of sections with a number of teeth on each section, with sharp cutting-edges, secured to the finger-bar in the same manner as above, in combination with an ordinary movable harvester-sickle operating between the stationary sickle and fingers I, connecting with the pitman and crank by the lever X moving on pivot $f$ on part G.

M N are endless aprons for conveying the grain after being cut off into the thrasher O.

These aprons are run by a double-pulley band-wheel, P, mounted upon the inner end of hub of grain-wheel E, and allowed to turn freely thereon; but, by means of the pawl and ratchet on wheel E, and pulley-wheel P, the aprons M and N are permitted to revolve in one way only, in direction of the thrasher O indicated by arrows; or the pulley-wheel P can be mounted upon the outer end of hub of the drive-wheel B, next to the heading attachment, and run by a pawl and ratchet-gearing in the same manner as above set forth.

The thrasher O consists of a small cylinder and concave, or its equivalent, suitably spiked for the purpose of thrashing the grain from the heads as they are carried in by the aprons M and N.

This cylinder in thrasher O is mounted upon frame T, which is supported by long legs, U U, on frame A.

These legs U U have brace-lugs, $h\ h$, at right angles to each other, to brace and support frame T firmly.

The thrashing-cylinder is run by a band-wheel attached to the end of cylinder-shaft at one side of frame T, by a band, V, connecting with a grooved wheel on the sickle-driving pinion, so that the same power that runs the sickles will give motive power to operate the thrashing-cylinder.

Under the thrasher O, and behind the cylinder, is a spout or trough, S, so inclosed on its sides under the thrasher O as to catch all the grain and chaff as it passes through the cylinder, and, being much lower at one end than the other, the motion of the harvester over the ground will shake the grain and chaff down in the box W, the receptacle for the thrashed grain, which latter is hinged to the rear end of frame A at $y\ y$, and mounted on caster-wheel $t$ in the rear, which box W can be made of suitable capacity for holding the grain and chaff that is grown upon a quarter to an acre of ground, as is most convenient and desirable.

The driver's seat can be attached to frame A either in front or to the rear of thrasher O.

The thrasher O and thrasher-frame T are set on a firmly-braced frame of legs U U U U.

These legs at their feet rest on the two drive-wheel harvester draft-frame A A, and are fastened by bolts or otherwise thereto, so as to be readily applied or removed, so as to leave the harvester or mower-frame for use separately. Also, the header side attachment can be removed to leave an ordinary reaper and mower-frame.

The mode of operating this machine is thus:

As it is drawn over the field, the teeth I and reel J bring the straw of the grain in contact with the sickles, cutting off the heads as short as possible, leaving the straw standing in the field. They are immediately carried by the aprons M and N into the thrasher O; from thence into the trough or spout S down into the box W, which can be emptied at intervals to the place of storage.

Having thus described my invention,

What I claim as new, and desire to secure by Letters Patent, is—

1. The hinged box W hinged to the draft-frame and running on casters $t$, substantially as specified.

2. The bar C, the hinged braces F F', the shaft D, and nut $c$, all arranged in the manner as and for the purpose specified.

3. The flanged braces $h$ on top of legs U supporting the thrasher-frame T, arranged in the manner as and for the purpose set forth.

4. In combination with a two-drive-wheel harvester draft-frame A, a thrasher, O, and thrasher-frame T, made and arranged to be readily removable to leave a harvester and mower-frame for use, as specified.

J. D. FIELD.

Witnesses:
SAMUEL JACOB WALLACE,
JOSIAH SMITH.